Oct. 11, 1932.  R. L. MULLER  1,881,856
ACCOUNTING MACHINE
Filed Oct. 17, 1928  4 Sheets-Sheet 1

INVENTOR
Robert L. Muller
BY
Rector, Hibben, Davis, & Macauley
ATTORNEYS

Oct. 11, 1932.  R. L. MULLER  1,881,856
ACCOUNTING MACHINE
Filed Oct. 17, 1928    4 Sheets-Sheet 4

| PROOF | | FOLIO | LEDGER (STOCK RECORD) | | | | | |
|---|---|---|---|---|---|---|---|---|
| | | | RECEIVED | | | DELIVERED | | BALANCE |
| | | | DATE | QUANTITY | VALUE | DATE QUANTITY VALUE | QUANTITY | VALUE |
| JAN15 1234 | 678.49− | JAN15 1234 | JAN15 | 328 | 48.36 | | 1234 | 678.49 |
| | 328 | 678.49 | | | | | 1562 | 726.85S |
| | 48.36* | | | | | | | |

| PROOF | | PICK-UP | LEDGER (COMMERCIAL POSTING) | | | | |
|---|---|---|---|---|---|---|---|
| | | | CHARGE | | CREDIT | | BALANCE |
| | | | DATE FOLIO AMOUNT | | DATE FOLIO AMOUNT | | |
| JAN30 280 | 32.86− | 32.86 | JAN30 280 | 76.85 | | | 32.86 |
| | 76.85* | | | | | | 109.71S |

INVENTOR
Robert L. Muller
BY
Rector, Hibben, Davis & Macauley
ATTORNEYS

Patented Oct. 11, 1932

1,881,856

UNITED STATES PATENT OFFICE

ROBERT L. MULLER, OF DETROIT, MICHIGAN, ASSIGNOR TO BURROUGHS ADDING MACHINE COMPANY, OF DETROIT, MICHIGAN, A CORPORATION OF MICHIGAN

ACCOUNTING MACHINE

Application filed October 17, 1928. Serial No. 312,967.

This invention relates to an accounting machine, particularly to a machine that may be quickly and easily converted from one capable of doing a certain class of work to another capable of doing a considerably different class of work.

Business institutions often find accounting machines useful in different lines of work in which the functions to be performed by the machine vary considerably. Two lines of work in which such machines are quite generally used are "stock record posting" and "commercial posting". Stock record posting involves keeping track of stocks of goods both as to the quantity and the value of goods on hand. Commercial posting involves ordinary bookkeeping operations in connection with customers' accounts. Present machines capable of one kind of posting are not capable of doing the other without quite a number of changes and adjustments which the user is not in a position to make. The result is that a different machine is generally employed for each purpose. In small business concerns, the volume of work is often not large enough to warrant the purchase of two machines. The machines are expensive and not only involve a large first cost but the amount of both kinds of work is often such that one employee can take care of it with the result that, if two machines are obtained, one of them is idle while the other is being used which is uneconomical. It is highly desirable to have a machine that is capable of both uses, but in order that such a machine may be of practical value, it must be such that it can be quickly and easily converted from one type to the other by an ordinary operator. The present invention is directed to this end.

The object of the invention is to provide an improved accounting machine that may be quickly converted from one type of machine to another so as to permit a single machine to be used for different purposes.

A more particular object of the invention is to provide an accounting machine that may be converted from one capable of commercial posting to one capable of stock record posting and vice versa by moving a single manipulative member.

Other objects and advantages of the invention will appear from the specification and drawings.

An embodiment of the invention is shown in the accompanying drawings in which.

The invention is shown applied to a Burroughs accounting machine which will be described only briefly, since the machine is well known in the art and described in detail in many patents.

General features

Figure 1:
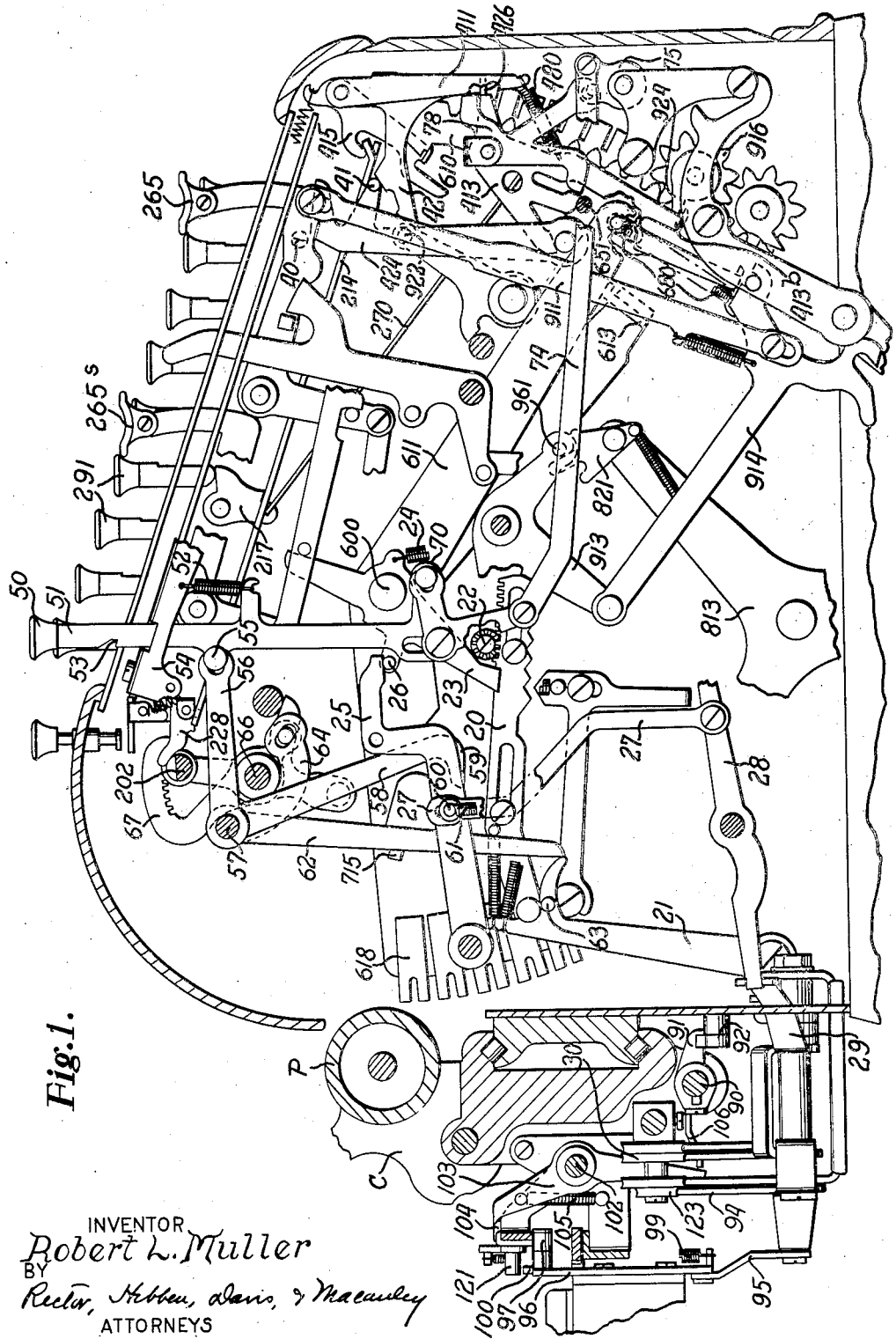
Figure 1 is a left side elevation of a Burroughs accounting machine with the invention applied thereto, the view showing the machine with the casing removed and some of the parts omitted in order to simplify the illustration.
Figure 2:
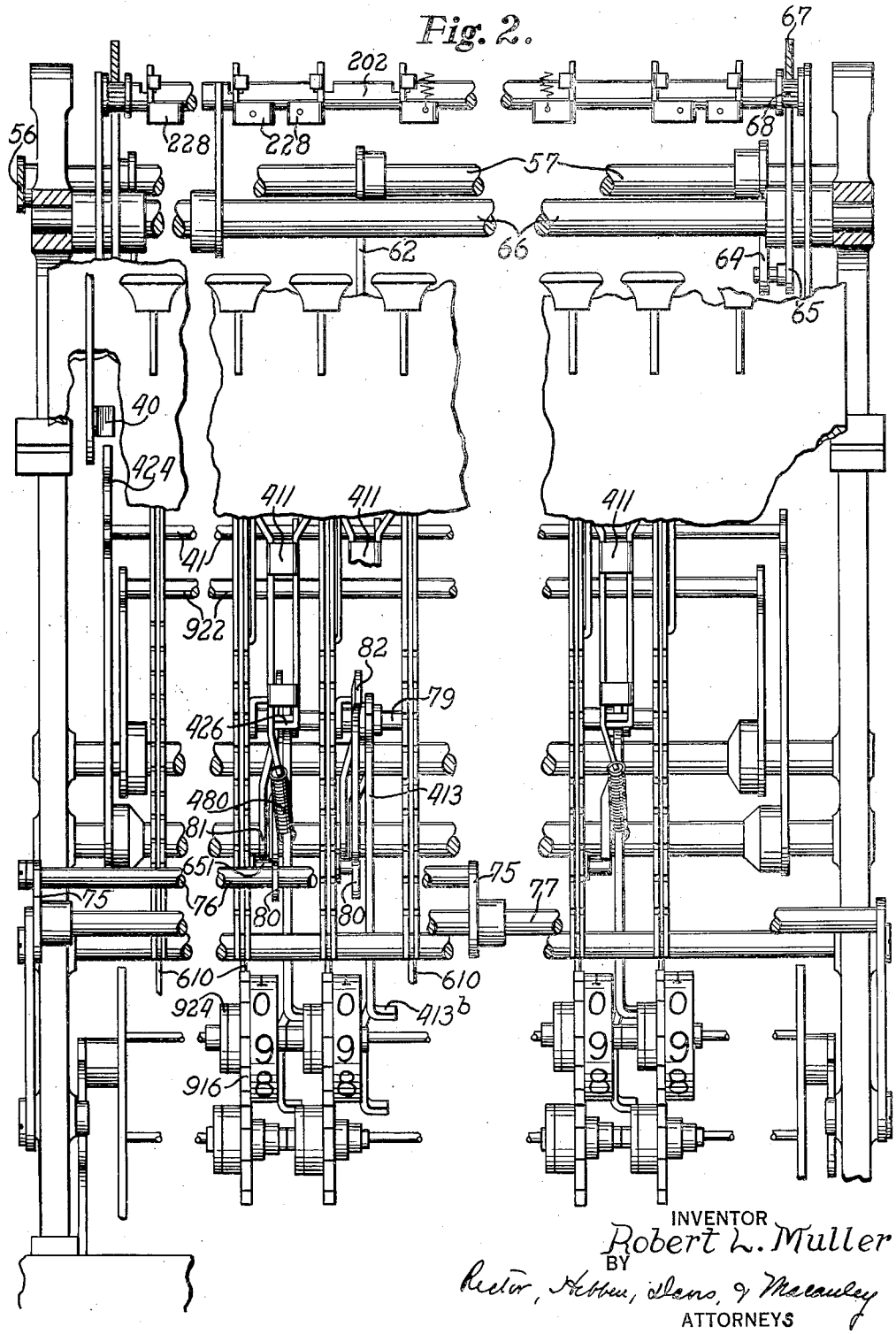
Fig. 2 is a front elevation of the machine with certain of the parts cut away so as to show others more clearly, all the parts being in normal position.

Referring to Fig. 1 the machine is provided with a plurality of banks of amount keys 291 each of which is provided with a detent 217 controlling a stop wire 270. When one of the keys is depressed its detent 217 is rocked clockwise to pull rearwardly on its stop wire 270 which is moved to a position to arrest the descent of its actuator rack 610. As the detent 217 rocks clockwise it moves a key-latching plate 214 rearwardly where it is held by a latch 228. This prevents the detent 217 from returning to normal and holds the key depressed. During the latter part of the return stroke of the machine a restoring bail 202 moves forwardly and raises all of the latches 228 to release all the plates 214 that may have been moved rearwardly to thereby release the depressed amount keys. In this manner all of the amount keys are released at the end of each operation of the machine.

The actuator racks 610 are carried by arms 611 pivoted on the shaft 600. The arms 611 have type bars 618 on their rear ends adapted to be positioned relative to the printing line of a platen P on a traveling paper carriage C at the same time that the actuator racks are positioned. After the type bars 618 are positioned they are driven into engagement with the paper held around the platen by means of hammers 715 that are fired by a suitable printing mechanism which is well known in the art, reference being made to Burroughs Patent No. 505,078.

The printing mechanism is controlled by a sliding link 20 which is moved to different positions by a lever 21 controlled by the paper carriage C. It will be understood that there is an arm 611 carrying types 618 in each order or bank of the machine and that there is a hammer 715 for each of these banks. The front end of the slide 20 has teeth in it which mesh with a pinion 22 so that when the slide is moved the pinion is rotated. Rotation of this pinion moves a cam shaft such as described in Muller Patent No. 1,397,774 which blocks the action of the hammers 715 in predetermined orders in the machine. Understanding of the details of this hammer blocking mechanism is not necessary for an understanding of the present invention, it being sufficient to know that the printing mechanism is controlled in the general manner described, reference being made to said Muller patent for details.

The actuator racks 610 are normally held upward by latches 415 which, however, are released in all banks in which amount keys are depressed by the rearward movement of the slides 214 in said banks, said slides having projections on their forward ends engaging tail pieces on the latches 415 to release the latter. The arms 611 are held upwardly by a bail 613, hence, even though the latches 415 are released by depression of the amount keys, the actuator racks 610 will not descend immediately. As the machine is given a forward stroke of operation the bail 613 moves downwardly away from the arms 611 whereupon the actuator racks 610 descend to differential positions determined by the stop wires 270 that may have moved rearwardly by depression of the amount keys. The arms 611 move down with and are arrested with the actuator racks which results in positioning the type bars 618 for printing. During the return stroke of the machine the bail 613 moves upwardly again and restores to normal all of the arms 611 together with the actuator racks 610.

In the normal or addition condition of the machine, a counter 916 is rocked into engagement with the actuator racks after they have moved to their lower differential positions and it remains in engagement with them while they are restored so that the differential movements of the actuator racks during their ascent are transmitted to the pinions of the counter 916 to register the items set up on the keyboard.

The counter is rocked into and out of engagement with the actuator racks by means of a pitman 914 connected to a three-armed member 913 having one of its upper arms extending forwardly and the other rearwardly, both of which arms carry studs 961, the rear arm not being illustrated in Fig. 1. The member 913 is rocked during operation of the machine by means of a pass-by pawl 821 carried on the end of a lever 813. During the forward stroke of the machine the lever 813 is rocked counter-clockwise and, at the beginning of the forward stroke, the pass-by pawl 821 engages the stud 961 on the forward arm of the member 913 and rocks said member counter-clockwise to move the counter out of engagement with the actuator racks. At the end of the forward stroke the pass-by pawl 821 passes the stud 961 on the rearwardly extending arm of the member 913 and then, upon the first part of the return stroke of the lever 813 in a clockwise direction, the pawl 821 engages the stud 961 on the rearwardly extending arm of the member 913 to rock said member clockwise to pull the counter 916 into engagement with the actuator racks.

It is sometimes desirable to prevent addition from occurring in the counter 916 and, in order to accomplish this, mechanism is provided for non-adding the machine. This mechanism comprises, in the machine illustrated, a pawl 23 urged clockwise by a spring 24 out of the path of the pass-by pawl 821. The pawl 23 may, however, be moved into the path of the pass-by pawl 821 by means of an arm 25, which, when moved downwardly, engages a stud 26 on the pawl 23 to move it counter-clockwise. The arm 25 is moved downwardly by a link 27 connected to a lever 28 that is rocked by a yoke 29, which, in turn, is moved by a roller 30 on the paper carriage C. In predetermined columnar positions of the carriage, the arm 25 is moved downwardly to move the pawl 23 into the path of the pass-by pawl 821. When this occurs the pass-by pawl 821 is prevented from acting at the beginning of the return movement of the arm 813 and, accordingly, the counter 916 is not rocked into engagement with the actuator racks and no adding action takes place.

Transfers take place between the pinions of different orders of the counter 916 by an extra step of movement of the actuator racks 610. It will be observed, by referring to Fig. 1, that the actuator racks are connected to the arms 611 by a pin and slot connection and that a spring 680 serves to urge the actuator racks upwardly. Each rack carries a stud 651 which normally strikes a central projection on a pawl 413 when the racks are moved upwardly. The pin and slot connection between the arms 611 and the racks 610 permits the arms to move upwardly in the slot after movement of the actuator racks has been stopped and accordingly the springs 680 are tensioned slightly so that if any of the pawls 413 are moved so that they are out of the paths of the studs 651 the racks will be moved an extra step upward. Each of the pawls 413 has a downwardly extending portion provided with a foot 413$^b$ positioned in the path of a transfer projection 924 on its counter pinion. When one of the counter pinions moves from its "9" to or through its "0" position, its transfer projection 924 cams the foot 413$^b$ rearwardly which moves the pawl 413 clockwise sufficiently to move its central projection out of the path of the stud 651, it being understood that each counter pinion controls a pawl associated with the actuator rack 610 that meshes with the pinion of next highest order. When the pawl 413 is moved rearwardly it is held in that position by a latch 411 having a foot 426 that engages over the upper edge of an extension of the pawl 413, each latch being urged clockwise by a spring 480. This transfer mechanism is a well-known feature of the Burroughs machine and a further description of it is not considered necessary as the same is described in many patents including Burroughs No. 504,963, September 12, 1893. After a transfer has occurred it is necessary to restore the latches 411 to normal to permit the pawls 413 to move to normal, said pawls being urged counter-clockwise by the springs 480 which are connected to them as well as to the latches 411. In order to restore the latches 411, the machine is given a spacing stroke during which a restoring bail 922 operates to restore the latches.

A total is taken by depressing a total key 265 which, through a link 911, changes the position of the pitman 914 so as to vary the time at which the counter 916 is rocked into engagement with the actuator racks, the total-taking operation in the Burroughs machine being a well-known feature described, for example, in Vincent Patent No. 913,860.

In order to prevent errors it is necessary to prevent the total key 265 from being depressed while the latches 411 are tripped. This is accomplished by the provision of a pivoted locking arm 424 having a wide upper end positioned so that it may be moved under a stud 40 on the bell crank lever which carries the total key 265. The arm 424 has a forward extension connected to a bail 41 that extends across the front of the machine in the rear of projections 42 of the latches 411. When one of the latches 411 is released and moved rearwardly its projection 42 engages the bail 41 and moves the arm 424 under the stud 40 so that the total key 265 cannot be depressed. It is, therefore, necessary to give the machine a spacing stroke to restore all of the latches 411 before a total can be taken. This insures proper operation of the machine.

A sub-total may be taken in the same general manner as a total by the depression of a sub-total key 265$^s$, the difference being that the total is left in the counter when the sub-total key is depressed whereas the counter is cleared by operation of the machine when the total key is depressed. The sub-total key is locked against depression in the same way as the total key, the sub-total key being connected with the same bell crank lever as the total key.

The paper carriage is provided with the well known Burroughs tabulating mechanism by means of which the carriage is automatically tabulated from column to column, the tabulating movement taking place at the end of the return stroke of operation of the machine. The carriage is automatically returned across the machine by a mechanism described in detail in Rinsche Patent No. 1,580,534.

In order that the present invention may be more easily understood a description of the machine as used for "stock record posting" will first be given.

Stock record posting

When a 17-column bookkeeping machine is used for stock record posting, the five columns or banks on the left side, herein called the "date section", are used for printing dates, the next four columns or banks to the right, herein called the "quantity section", are used for printing and accumulating the quantity of the items of which a record is to be kept, and the remaining eight banks, herein called the "value section", are used to accumulate and print the value of the items.

The "date section" is not provided with any counter or counter pinions as none are required in order to print the dates. The amount keys and the printing types are suitably inscribed for dates and depression of the keys merely indexes the types for printing the dates. In order to avoid having to depress the date keys for every posting, a date repeat mechanism is associated with this section, so that after the date has once been entered it is not necessary to have it entered again unless a different date is required. The details of this mechanism are described in Wing Patent No. 1,351,082.

The "quantity section" and the "value section" are each provided with counter pinions and they are controlled by the same total key 265. In fact, these sections operate in the usual manner to accumulate amounts entered on the amount keys, to print them, and to yield a total or sub-total when the machine is conditioned for such total or sub-total.

Figures 4, 5, 6:
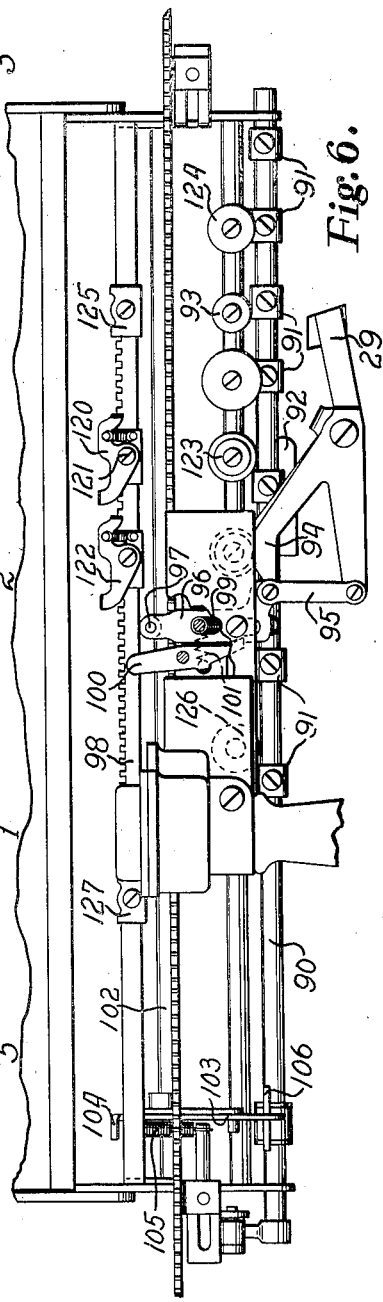
Fig. 4 illustrates "stock record posting" forms such as used with the machine.
Fig. 5 illustrates forms used in "commercial posting".
Fig. 6 is a partial rear elevation showing certain of the control connections on the rear of the paper carriage.

The use of the machine in stock record posting will be most easily understood by following through an example and, for this purpose, reference is made to Fig. 4 where an example is illustrated.

The first or starting position of the paper carriage is that between the proof strip and the stock ledger sheet, such position being indicated in Fig. 4 by the items printed on the proof strip and the ledger sheet enclosed by a line drawn around them. In the use of the machine no printing actually takes place in this position, the items have been placed on the form merely to indicate the starting position of the paper carriage. In this position the date is entered on the keys of the "date section" and the old balance comprising the quantity and value of the stock parts is picked up and entered on the keys of the "quantity" and "value" sections, said balance comprising, in the example illustrated, 1234 items having a value of $678.49. After the date keys are depressed the date repeat mechanism makes it unnecessary to depress them again for posting subsequent items. The machine is then given a stroke of operation which registers the number of the items, to wit, 1234, in the counter of the "quantity section", and the value $678.49 in the counter of the "value section". These amounts are not printed while the carriage is in the starting or No. 1 column, all the hammers of the printing mechanism being blocked by the mechanism heretofore described.

At the end of the stroke of operation of the machine in the starting column, the carriage tabulates to its second position indicated as the folio column on the stock record ledger sheet. The folio number is then entered on the amount keys and the machine given a stroke of operation to print said number in the folio column, the printing mechanism being conditioned to print the folio number but not the date. In this position of the carriage the non-add mechanism is conditioned so that no addition takes place in either the quantity or the value sections of the machine and hence the printing of the folio number does not change the condition of either the quantity or the value counter.

At the end of the stroke of operation in the folio column the carriage tabulates to its next or third columnar position which is the "received" column of the ledger sheet. In this column the quantity of articles received and their value are entered, the entry in the example being 328 articles valued at $48.36. When the machine is operated in this column, these entries are added to the entries already in the machine, that is, 328 is added to the original quantity of articles, 1234, and $48.36 is added to the value of the stock, to wit, $678.49. The quantity and value of received items are printed together with the date, the hammers of the printing mechanism being freed in this column by the carriage.

The carriage next tabulates to its fourth or "balance" column where a sub-total is taken by depressing the sub-total key 265ˢ. This prints the total of both the quantity and value of the items that have been entered in the machine, the result in the example given being 1562 articles having a value of $726.85. As will be understood, the taking of sub-totals leaves the sub-totals in the machine.

The carriage is next automatically returned across the machine by the mechanism described in Rinsche Patent No. 1,580,534, to its fifth position which is the left hand position on the proof strip. In this position the old balance is again picked up, that is, entered on the amount keys, after which it is subtracted from the totals in the counters. This old balance consists of 1234 articles valued at $678.49. The machine is then given a stroke of operation which results in printing the date and the old balance, together with a sign indicating that the old balance has been subtracted. During the operation this old balance is subtracted from the totals in the quantity and the value counters.

The machine next tabulates to its sixth position which is the right hand position on the proof strip, in which position a total is taken which should result in clearing the counters. In this position the date is not printed but the total remaining in the counter is printed. It will be clear that, if the operation has been correct, this total on the proof strip should correspond to the received items entered in the "received" column on the ledger sheet. This provides a check on the work because if these items do not correspond an error has been made.

After the machine has been operated in its sixth position the carriage tabulates to the starting position where the machine is ready for a new posting.

In commercial posting it is not necessary to register, add, and subtract both quantities and values of items. Instead, only dollars and cents transactions are involved. In such posting it is desirable to use the section called the "quantity section" in stock record posting for recording folio numbers but this section is not normally adapted for this purpose. To be usable for folio numbers, the keys should remain depressed in order that the folio number may be printed in several columns. On the other hand, if the keys should remain depressed in stock record posting, the folio number would be added into the counter pinions each time the machine was operated and difficulty would be encountered because the transfer mechanism would often block the total and sub-total keys. Also an incorrect number would appear when the number in the folio counter was printed when taking a total. Accordingly, in stock record posting, the keys in this section are returned to normal at the end of each operation of the machine hence, normally, the section is not in shape to repeat the folio numbers. This means that the machine must be changed in order to convert it into a commercial posting machine. This is done by means of a converting mechanism which will now be explained.

Converting mechanism

Referring to Fig. 1, the machine is provided with a special converting key 50 having a long stem 51. This key is urged upwardly by a spring 52 which also serves to latch it in depressed position by causing a notch 53 in the key stem to remain in engagement with the edge of the plate 54 when the key is depressed. The machine is converted from a stock record posting machine to a commercial posting machine by depression of this key which performs four different functions.

In commercial posting it is not desirable to start operations with the carriage in a position between the proof sheet and the ledger sheet. Instead, operations are started in the left-hand column of the ledger sheet which is marked the "pickup" column in the form illustrated in Fig. 5, the carriage being tabulated to this position by hand or automatically by adjusting the tabulating mechanism as will be later described. In this column the date and old balance are entered on the keys, the date in the "date section" and the old balance in the "value section". When the machine is operated it is desired that the old balance be entered in the counter and printed. It will be recalled, however, that, in this column in stock record posting (folio column) the non-add mechanism prevents addition. Provision is accordingly made to disable the non-add mechanism, such disabling being an incident to the depression of the converting key 50. The stem 51 carries a stud 55 (Fig. 3) which is straddled by the bifurcated end of an arm 56 fixed to a shaft 57 journaled at the rear of the machine. This shaft has another arm 58 fixed to it which arm extends downwardly and is provided on its lower end with a hooked portion 59 engaging under a stud 60 carried by the arm 25. It will be recalled that the non-add mechanism is rendered operative by a downward movement of the arm 25 caused by a roller on the paper carriage. When the key 50 is depressed the arm 58 is rocked clockwise which lifts the arm 25 upwardly and releases the pawl 23 which is thereupon rocked clockwise by its spring 24 out of the path of the pass-by pawl 821. The non-add mechanism is thus disabled and the machine is conditioned for addition. Upward movement of the arm 25 is permitted even though the carriage connections are conditioned to hold said arm down, provision being made for independent operation of the arm 25 by the yielding connection illustrated in Fig. 1 comprising a pin and slot connection between the link 27 and the arm 25 with a spring 61 normally transmitting the motion of the link 27 to arm 25. When the arm 25 is moved upwardly by the arm 58, the spring 61 yields.

It will also be recalled that, in stock record posting, the printing mechanism was conditioned to print in both the "quantity" and the "value" sections of the machine, in the "received", the "balance", and the two "proof" columns. In commercial posting, it is not desired to print the folio number in all of these columns and hence, since the "quantity" section is to be used for folio numbers, the printing mechanism must be conditioned differently. In order to accomplish the desired result, the shaft 57 is provided with a second downwardly-extending arm 62 positioned to engage a stud 63 carried by the arm 21 that moves the link 20 which controls the blocking of the printing hammers. The parts are proportioned so that when the key 50 is depressed and the shaft 57 is rocked clockwise, the arm 62 moves far enough clockwise to position the slide 20 in its second position toward the left from its Fig. 1 position which is the position that eliminates printing in the "quantity" section. The effect of this will be explained for each column, it being understood that the same carriage controls for the printing mechanism are operative when the machine is used for commercial posting as were operative when the machine was used for stock record posting. Starting in the "pickup" column, printing is allowed only in the amount section, the link 20 occupying its second position to the left from Fig. 1 due to depression of key 50. The next position is the "charge" column where the date, the folio number and the amount are to be printed, this position being the third position of the link 20 to the left from its Fig. 1 position, movement to the third position not being interfered with by the arm 62 which limits the link 20 only in its movement to the right. The carriage then tabulates to the "balance" column where the carriage controls are such as to permit the slide 20 to move to its first position, that is, the extreme right hand position where printing is permitted in both the "quantity" section (now the folio section) and the "value" section. However, the slide 20 cannot move to this position when the key 50 is depressed because of the engagement of the arm 62 with the stud 63. The slide 20 is accordingly arrested in its second position which eliminates printing in the "quantity" section but permits it in the "value" section. This enables the balance to be printed in the balance column on the commercial posting ledger sheet without printing the folio number. The machine then tabulates to the first proof column where the date, the folio number and the amount are printed, this being the third position to the left for the slide 20. The next position is the second proof column where, ordinarily, the slide would move to its extreme right position but with the key 50 depressed it is arrested in its second position so as to eliminate printing of the folio number while permitting printing of the balance. In this manner, even though the same carriage controls are used, the printing mechanism performs differently in commercial posting work.

Figure 3:
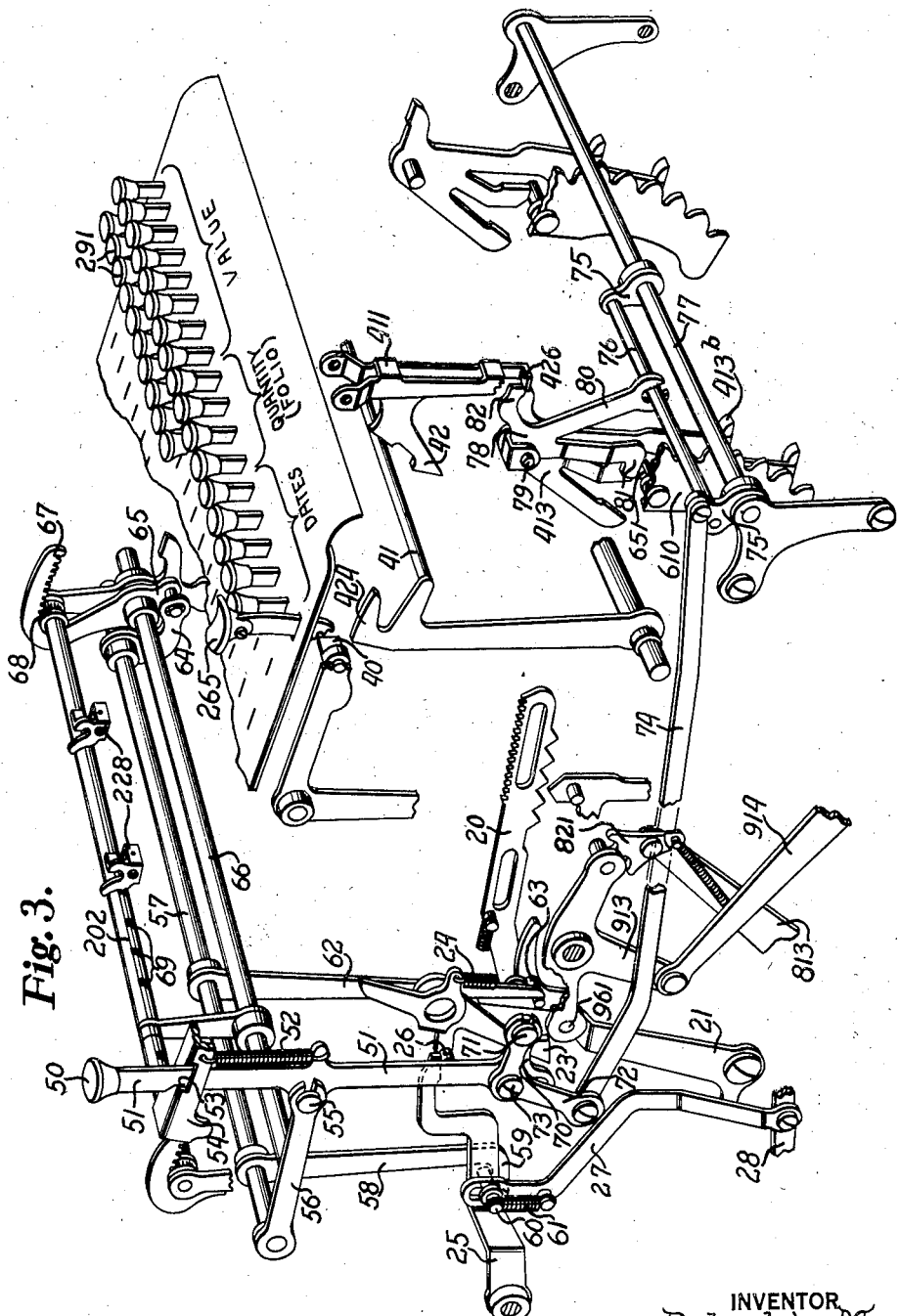
Fig. 3 is a perspective view of the principal parts of the present invention showing them in the position they occupy when the special key associated with the invention has been depressed.

The amount keys in the "quantity" section are normally released at the end of each operation of the machine but when the machine is to be used for commercial posting it is desired to have these keys remain depressed so that the folio number will be printed in several columns in the manner previously explained. In order that this may be accomplished the shaft 57 is provided with an arm 64 (Fig. 3) having a pin and slot connection with a second arm 65 pivoted on a cross shaft 66. The upper end of the arm 65 has a lateral arcuate projection 67 provided with teeth on its inner edge which mesh with a pinion 68 fixed to the restoring shaft or bail 202. When the key 50 is depressed and the shaft 57 rocked clockwise, the arm 64 rocks the arm 65 clockwise which rotates the shaft 202 clockwise. The shaft 202 has four half-round slots 69 in it which, when the shaft is rotated to the position of Fig. 3 are on the under side of the shaft and in alignment with the latches 228 for the banks of keys in the "quantity" section of the machine. The arrangement is such that, when the shaft or restoring bail 202 is moved forward at the end of an operation of the machine, as it is in Burroughs machines, the slots will be on the upper side of the shaft in alignment with the latches 228 which will then move into the slots and will not be tripped by the bail. Accordingly, the keys that have been depressed in the "quantity section" will remain depressed until released by column release keys or by an operation of the machine after the key 50 has been released.

With the keys in the "quantity" section held depressed the folio number would normally be added into the counter pinions of the section each time the machine was operated when it is in addition condition, and sub-totals and totals would be taken at the same time that such sub-totals and totals were taken in the "value" section since the same total and sub-total keys control both sections. These adding operations would cause transfers to take place from time to time which, if allowed to occur, would interfere with the operation of the total and sub-total keys.

For example, when the machine is operated in the "charge" column, in commercial posting, the folio number is entered in the folio counter pinions. When the machine is operated in the "balance" column the folio number adds to the prior folio number since the keys remain depressed and a transfer will very likely take place. When this transfer occurs a spacing stroke is required to restore the latches 411 so as to permit the sub-total key to be depressed in the balance column. However, when the spacing stroke is given the keys in the folio section remain depressed and the folio number is again entered in the folio counter pinion which may again cause a transfer. This will leave the machine in the same condition, to-wit, operation of the sub-total key will be prevented. It will be clear that, under these conditions, the sub-total key never could be operated unless a condition would occur where the adding of the folio number would not cause a transfer. In order to prevent the blocking of the sub-total key, a mechanism is provided which is conditioned by the key 50 to prevent the latches 411 from blocking the total and sub-total keys, said mechanism serving, in the embodiment illustrated, to also prevent transfers from taking place in the "quantity", now the "folio" section.

The lower part of the key stem 51 of key 50 has a lateral projection 70 carrying a stud 71 that engages in the bifurcated end of one arm of a bell crank lever 72 pivoted to a frame stud 73. The other arm of this bell crank lever is connected by a link 74 to one arm 75 of a bail 76, the supporting arms 75 for the bail being pivoted on a cross shaft 77 of the machine. A detent 78 is provided for each of the banks in the "folio" section, each of said detents being pivoted on a short shaft 79 and having an arm 80 provided with a bifurcated end straddling the bail 76. Each detent 78 has a downwardly projecting portion 81 adapted to be positioned in the path of the stud 651 carried by its rack 610. Each detent has another arm 82 normally positioned above but adapted to be positioned in the path of the foot 426 of its latch 411. When the key 50 is depressed the bell crank lever 72 is rocked clockwise which moves the link 74 rearwardly. This moves the bail 76 rearwardly and rocks the detents 78 clockwise to position their arms 81 in the paths of the studs 651 and their arms 82 in the paths of the feet 426 of the latches 411. Accordingly, when the transfer pawls 413 are tripped by the counter pinions in the "folio section", which action would normally release the latches 411 and permit the racks 610 to have an extra step of movement, such action is prevented because the latches 411 are blocked and the racks 610 are prevented from moving up an extra step. The result is that, when the key 50 is depressed, no transfer can take place and, since the latches 411 cannot move rearwardly they will not act to swing the locking arm 424 under stud 40 and the sub-total key will not be blocked. This does not destroy the control of the sub-total key in the banks of the "value section" which section continues to operate as before, the bail 76 extending to the left of the "value section" and being effective only in the banks of the "folio section".

From the above it will be clear that, when the key 50 is depressed, four different parts of the machine are automatically conditioned so as to function quite differently from what they ordinarily do thereby converting the machine into one capable of a different kind of work. These four changes are (1) the non-add mechanism is disabled so that the machine is placed in addition condition even though the carriage is in the columnar position for non-adding the machine; (2) the printing mechanism is conditioned so as to print only in certain columns which alters the printing arrangement as controlled by the carriage; (3) the releasing means for the amount keys in one section of the machine is disabled so that these keys will remain depressed after an amount has been set up in this section and (4) the control of the sub-total key by the latches associated with the transfer mechanism in one section of the machine is disabled and transfers are prevented in one section of the machine. Depression of a single key thus converts the machine that ordinarily is used for stock record posting into one that may be conveniently used for commercial posting. An example of commercial posting work is illustrated in Fig. 5.

*Commercial posting*

In commercial posting, the starting column is the pickup column which corresponds to the folio column in stock record posting. The machine may be tabulated to this position by hand or automatically as will be explained later. The machine is operated as usual in this column but the old balance is entered instead of the folio number. The old balance in the example illustrated is $32.86, which is registered in the counter when the machine is operated. In this column neither the date nor the folio number is printed.

The carriage is next tabulated to the "charge" column where the date, the folio number and the amount of the charge against the customer's account are entered and printed, the entry being Jan. 30, folio number 280, charge $76.85. The amount is added to the old balance because, in commercial posting, the charge column is a column for listing the purchases that the customer has made. The amount of the purchase is added to the old balance due.

The carriage next tabulates to the "balance" column where a sub-total is taken the same as in stock record posting. In this column the folio number and the date are not printed but the new total, $109.71, is printed, the machine printing an "s" after the total to indicate that it is a sub-total and that the amount has been left in the counter.

The machine then automatically returns the carriage across to the first proof column where the date, folio number and the old balance are printed. The old balance, $32.86, is entered in this column with the machine in subtract condition, as indicated by the minus sign after the entry, so as to subtract the old balance from the new balance. The date, folio number and old balance are printed in this column.

The carriage next tabulates to the second proof column where a total is taken and printed, the counter in the amount section being cleared and the total apearing, in the example illustrated, as $76.85, which should and does, in the example given, correspond to the entry in the "charge" column. The date and the folio number are not printed in this column.

The carriage then tabulates back to the "pick-up" position ready for a new posting.

*Tabulating mechanism*

As previously explained, the starting column for commercial posting is not the starting column ordinarily used for stock record posting. Assuming that the machine is set for stock record posting, when the key 50 is depressed to condition it for commercial posting, the carriage must be tabulated to the second stock record posting position, which corresponds to the "pick-up" or starting column of the commercial posting form. This may be done by hand and it is consequently not necessary to change the tabulating mechanism in order to perform commercial posting, but it is more convenient to have this change in the starting column taken care of automatically and, accordingly, provision has been made whereby, by the adjustment of a simple stop, the tabulating mechanism may be changed so that the carriage will automatically tabulate to the proper starting column for commercial posting.

Referring to Fig. 6, the carriage is provided with the usual shaft 90 carrying carriage stops 91 that engage a stop plate 92 to arrest the carriage in its different columnar positions. Tabulation is effected by momentarily rocking this shaft counterclockwise as viewed in Fig. 1 to release from the stop plate 92, the carriage stop that may be engaging it, the shaft being released in time to permit it to return to normal to enable the next stop to engage the stop plate to arrest the carriage in the next columnar position. The stops 91 are adjusted in definite positions to arrest the carriage in the proper columnar positions for stock record posting.

In order to change the columnar positioning of the carriage, particularly the starting column without changing the adjustment of the stops 91, the carriage is provided with a roller 93 adapted to engage an arm 94 to which is connected a link 95 that, in turn, is connected to a slide plate 96 having a stud 97 engaging under a pivoted bail 98. The slide 96 is urged upwardly by a spring 99 (Fig. 1) but when the roller 93 strikes the arm 94, the slide is moved downwardly, whereupon it is latched in its downward position by a latch 100 which is urged counterclockwise by a spring 101. Pivoted on a shaft 102 (Fig. 1) is a lever 103 having a lip 104 on its upper end that extends over the bail 98. This lever is urged counter-clockwise by a spring 105, but it is normally prevented from moving by a plate 106 fixed to and projecting from the shaft 90 that carries the carriage stops.

The roller 93 is positioned so that, as the carriage enters its last position, that is, its second proof position, the roller strikes the arm 94 and moves the slide 96 downwardly. This releases the bail 98 which then moves downwardly by gravity and this, in turn, releases the lever 103 which moves until it strikes the edge of plate 106. In tabulating the carriage from its last proof position, the shaft 90 is rocked counter-clockwise as viewed in Fig. 1, such rocking action occurring during the latter part of the operation of the machine in the last proof column. When the shaft 90 is rocked, the plate 106 moves downward far enough to permit the lower end of the lever 103 to move over the plate thereby preventing the shaft 90 from returning to its normal position and holding all of the carriage stops out of active position. This means that the carriage will then move to its full limit to the right in Fig. 6 unless some means releases the shaft 90 on which the carriage stops are mounted. A releasing means is provided comprising an easily adjustable stop 120 mounted on the bail 98. This stop carries a stud 121 adapted to engage the latch 100. The stop 120 may be quickly adjusted along the bar to any desired position. When the stop 120 engages the latch 100 as the carriage moves from left to right in Fig. 6, it releases the latch thereby permitting the slide 96 to be raised under the influence of its spring to raise the bail 98. The bail engages the lateral lip 104 on the lever 103 and rocks the lever clockwise to release the plate 106 to permit the shaft 90 to return to normal. The carriage stops 91 then become active and the carriage is stopped in its next columnar position.

In order to cause the carriage to skip the stock record starting column and stop in the next or commercial posting starting column, the stop 120 is positioned so as to engage the latch 100 just after the carriage moves past the stock record starting column and before it reaches the next column. The carriage stops 91 then become active to stop the carriage in the folio column for stock record posting which is the "pickup" column for commercial posting. It will be readily understood that in order to change the adjustment when the machine is restored to stock record posting form the stop 120 is moved back so that it trips out the latch 100 immediately after the carriage moves out of its last proof position and before it reaches the stock record starting column.

Other stops of the type of stop 120, such as stop 122 and other rollers such as roller 123, may be employed to cause the carriage to skip other columns, such stops being used in some cases to cause the machine to skip from the "folio" column to the "delivered" column immediately in stock record posting or to skip from the "pickup" column to the "credit" column immediately in commercial posting. A similar roller 124 and a stop 125 are used to stop the carriage in the first proof column and a roller 126 and a stop 127 are used to stop the carriage in the balance column.

While this adjustment for the tabulating mechanism is a great convenience it is not absolutely necessary to use it in order to change the machine from a stock record posting machine to a commercial posting machine because the carriage can always be tabulated to the proper position by hand. The adjustment, however, provides convenient means for avoiding hand operation and thus saves considerable time.

It is to be understood that the structure shown is for purposes of illustration only and that variations may be made in it without departing from the spirit and scope of the invention as defined by the appended claims.

I claim:

1. The combination in a calculating machine having a transfer mechanism, a total key, and means controlled by said transfer mechanism for preventing operation of the total key when a transfer takes place; of a key and connections for disabling the control of said total key by certain sections of said transfer mechanism.

2. The combination in a calculating machine having a total key, a transfer mechanism including latches that are moved when a transfer takes place, and connections operated by movement of said latches for preventing operation of the total key, of a manipulative member, and means conditioned by said manipulative member for preventing movement of certain of said latches when a transfer takes place to thereby prevent the locking of the total key by transfers in certain portions of the transfer mechanism.

3. The combination in an accounting machine adapted to perform "stock record" posting having banks of amount keys, latching mechanism therefor, releasing means for the latching mechanism, a counter having a transfer mechanism, a non-add mechanism for the counter, a printing mechanism, and a paper carrriage with connections for conditioning the printing mechanism to print in a predetermined manner in certain columnar positions of the carriage; of means for readily converting the machine into one capable of performing "commercial" posting comprising a key and connections to said releasing means, said transfer mechanism, said non-add mechanism and said printing mechanism, such that, when said key is depressed, the non-add mechanism is disabled, the amount key releasing means and the transfer mechanism are disabled in certain banks of the machine, and the printing mechanism is conditioned to print in a different manner than normal in predetermined columnar positions of the carriage.

4. The combination in an accounting machine adapted to perform "stock record" posting having banks of amount keys, latching mechanism for latching the keys depressed, releasing means for said latching mechanism, a counter having a transfer mechanism, a total key, connections controlled by the transfer mechanism for preventing operation of the total key when a transfer takes place, a non-add mechanism, a printing mechanism, a traveling paper carriage, and connections controlled by the paper carriage for enabling said non-add mechanism in predetermined columnar positions of the carriage and for conditioning the printing mechanism to print in a predetermined manner in certain columnar positions of the carriage; of means for readily converting the machine into one capable of performing "commercial" posting comprising a key and connections to said releasing means, said transfer mechanism, said non-add mechanism and said printing mechanism such that, when said key is depressed, the non-add mechanism and a certain section of the amount key releasing means are disabled, a certain section of said transfer mechanism is disabled from locking the total key, and the printing mechanism is conditioned to print in a different predetermined manner in certain columnar positions of said carriage.

5. The combination in a calculating machine having a traveling paper carriage, a printing mechanism, and means governed by said carriage including a movable member controlling said printing mechanism to cause different sections of said mechanism to print in different columnar positions of said carriage; of a key and connections acting, when set, to limit the movement of said movable member to alter the effect of the control of said printing mechanism by said carriage in certain columnar positions of the latter.

6. An accounting machine adapted to perform "stock record" posting having banks of amount keys, latching means for said keys normally released at each operation of the machine, a non-add mechanism, a total-taking means, a printing mechanism, a registering mechanism, said registering mechanism having connections for locking said total-taking means against operation under certain conditions, a paper carriage, said paper carriage having connections for automatically controlling said non-add mechanism and for selectively controlling the printing and registering mechanisms in certain orders of said mechanisms in predetermined columnar positions of the carriage, and a key and connections acting, when manipulated, to disable certain portions of said key-releasing mechanism, to disable the control of said total-taking means by certain orders of said registering mechanism, and to change the character of the carriage control of certain orders of said printing and said registering mechanisms whereby said machine is converted, by the depression of said key, into one capable of performing "commercial" posting.

In testimony whereof, I have subscribed my name.

ROBERT L. MULLER.